United States Patent Office 2,730,732
Patented Jan. 17, 1956

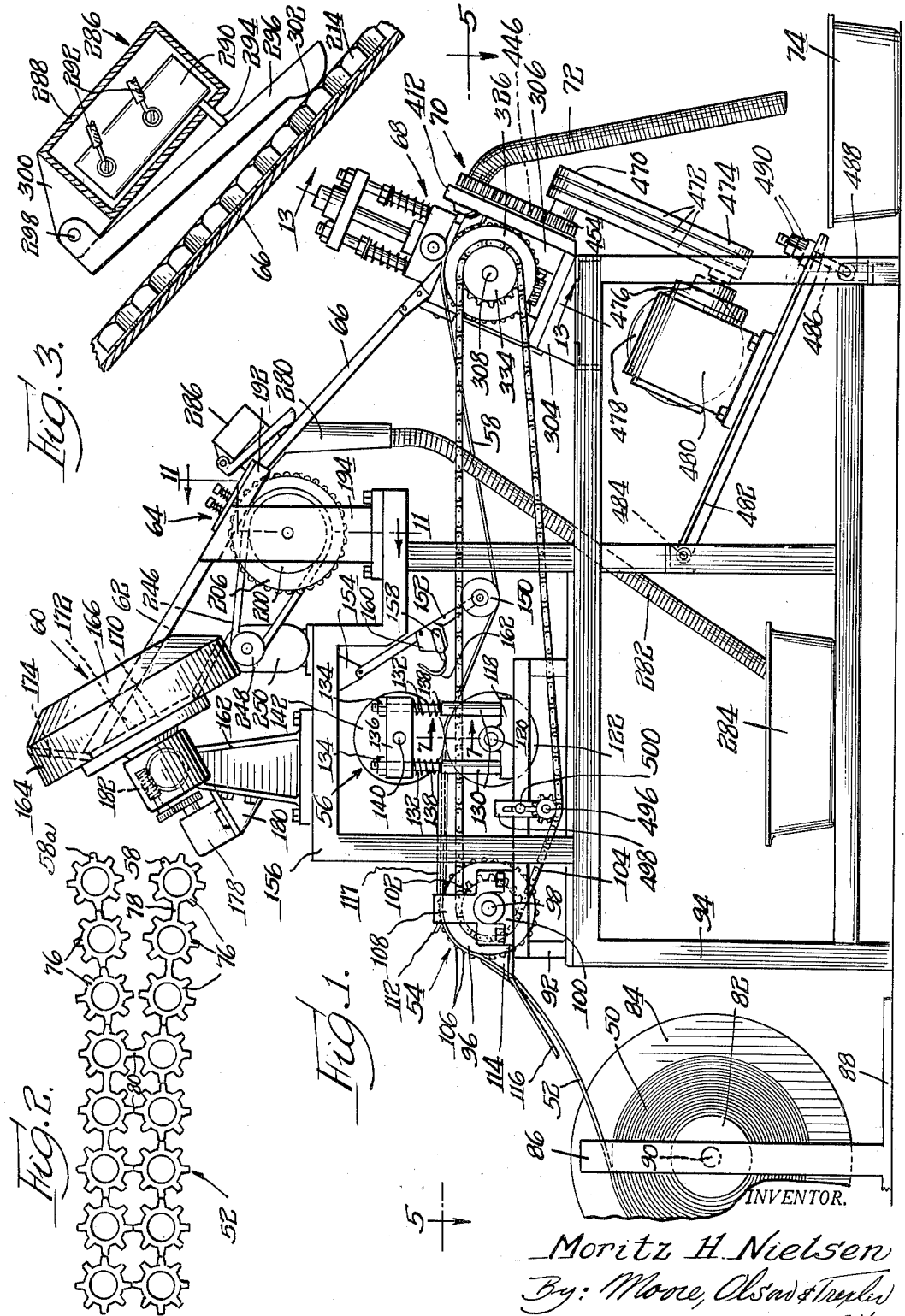

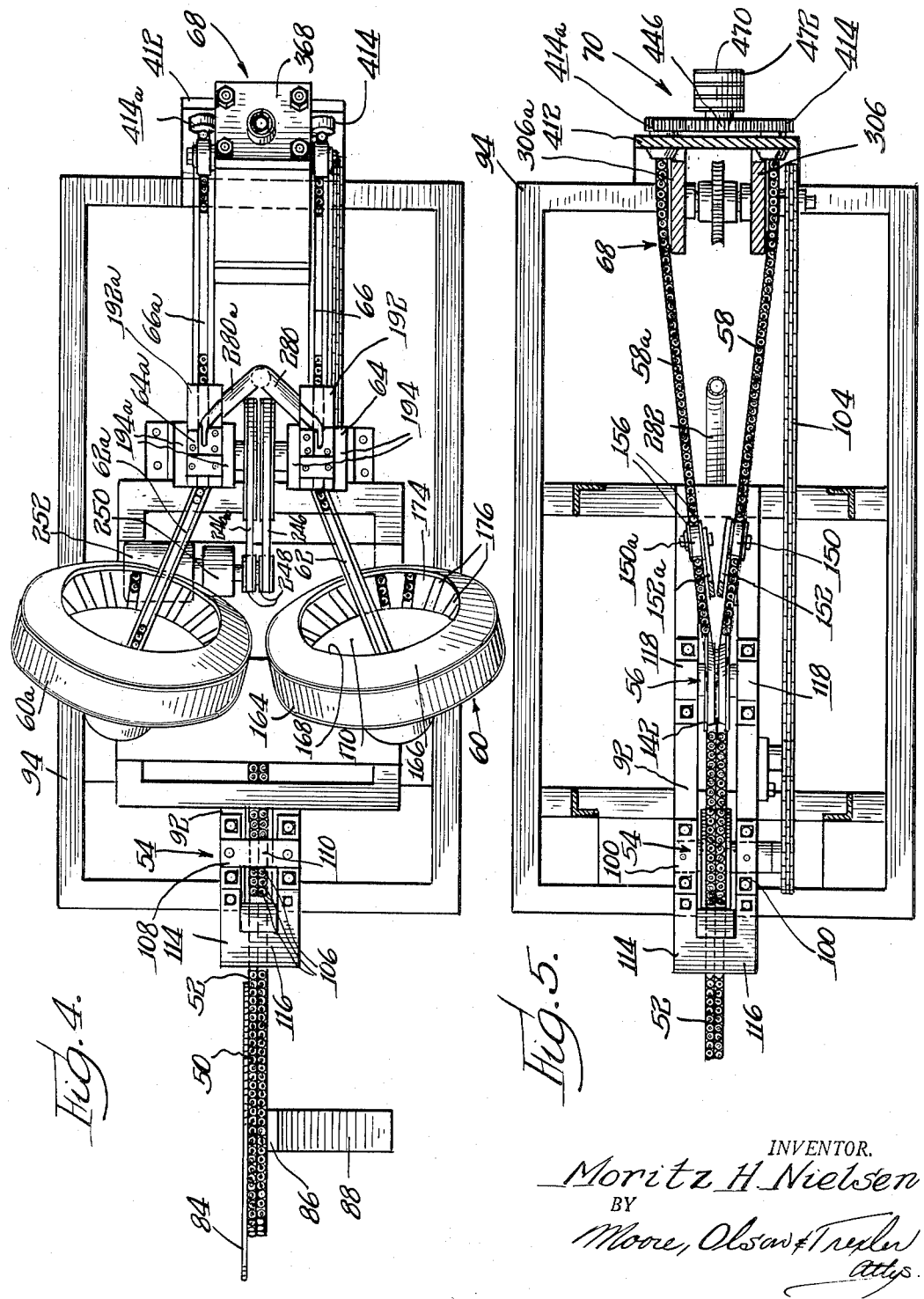

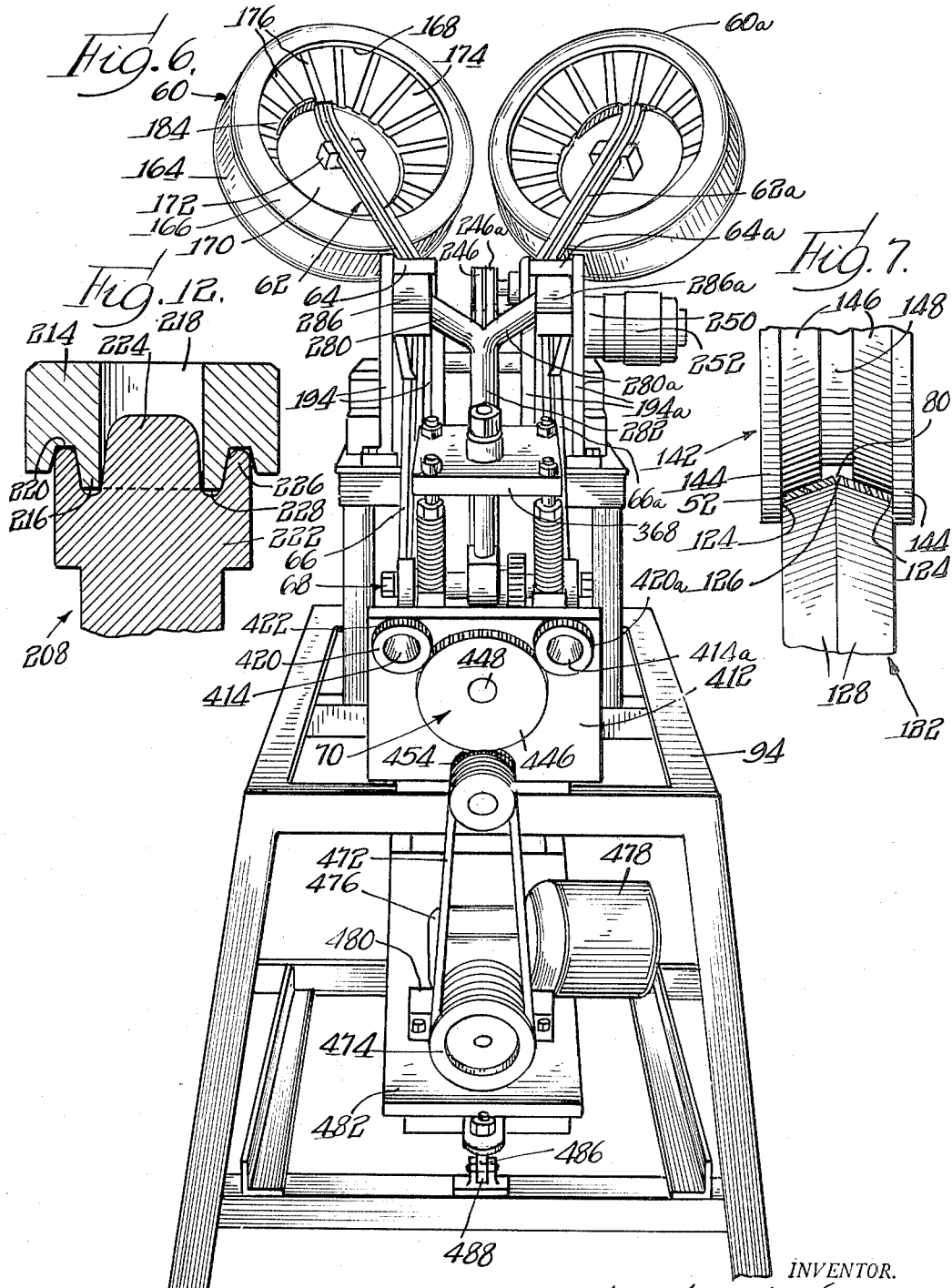

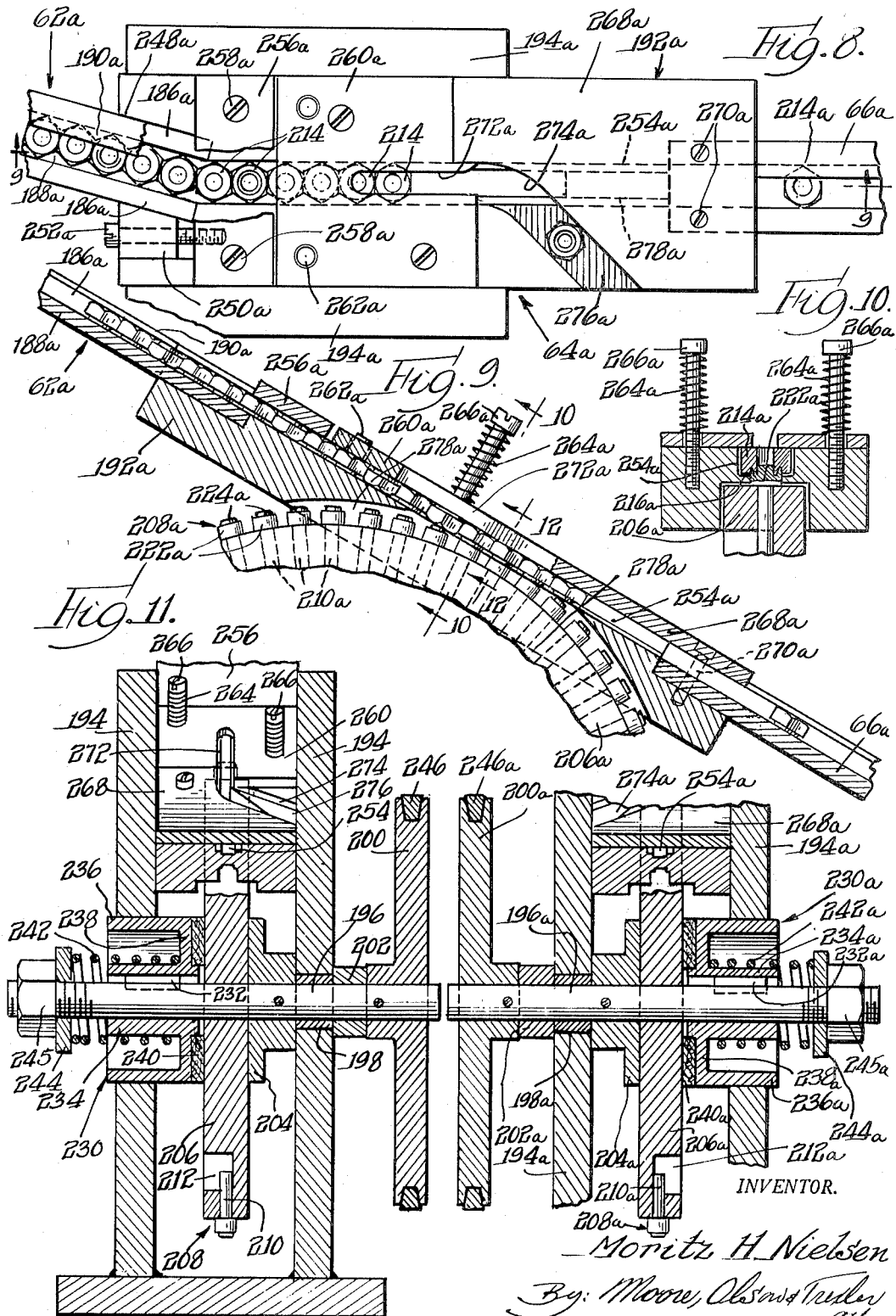

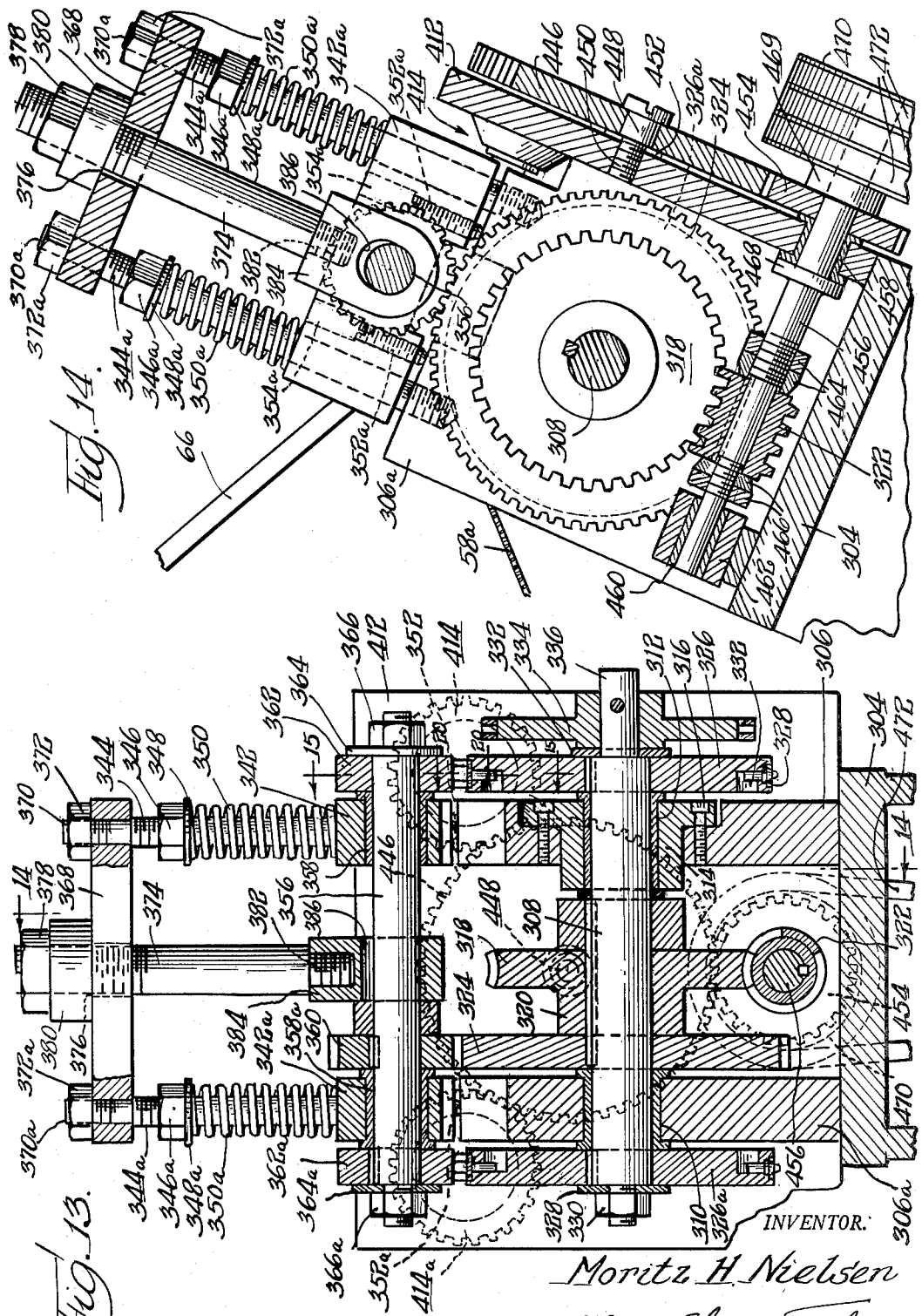

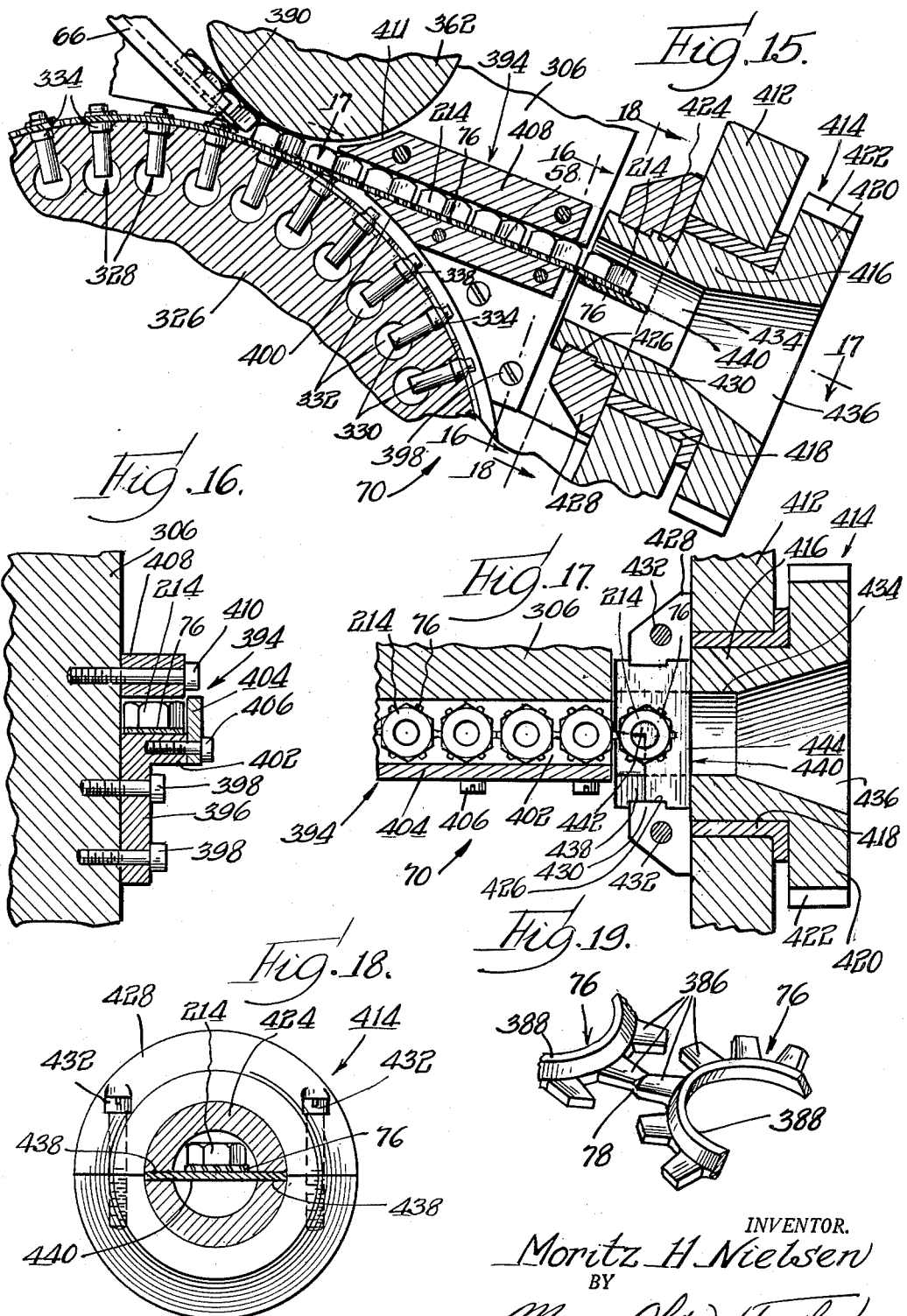

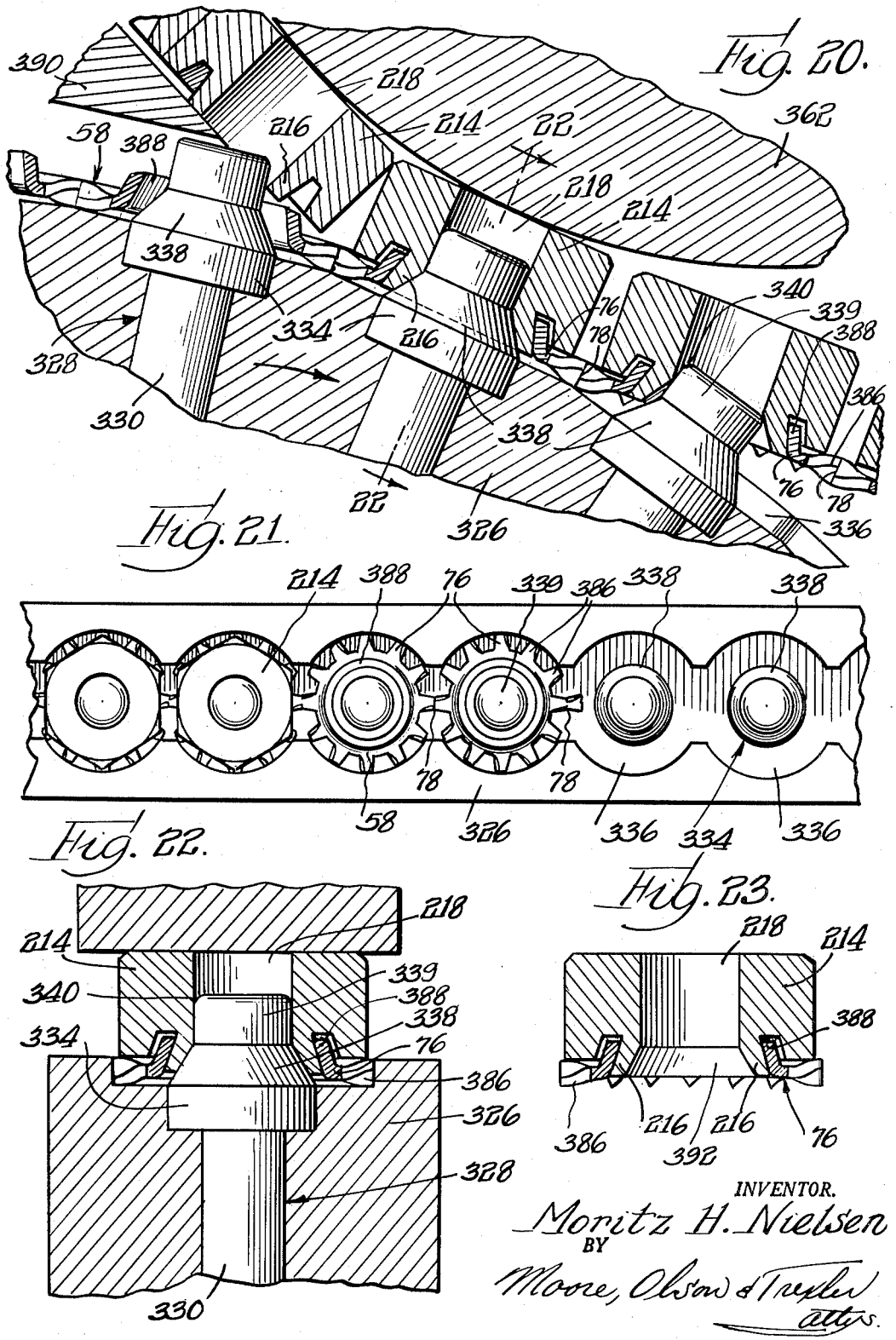

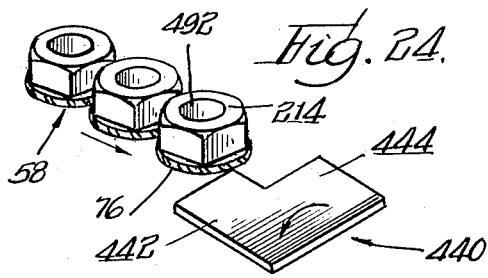
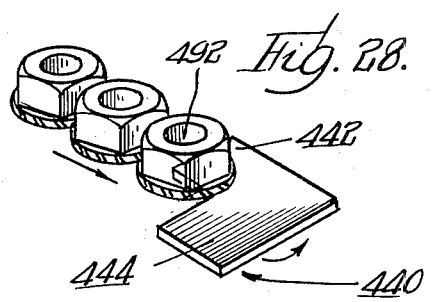
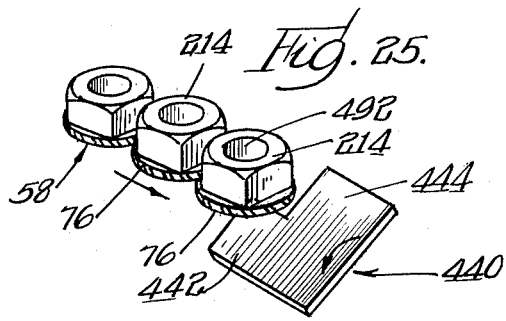
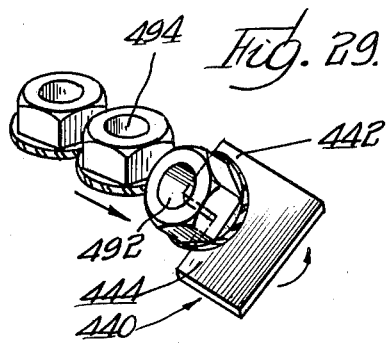
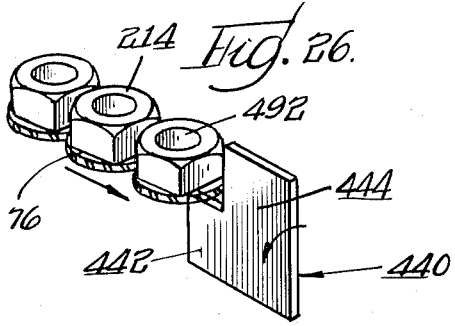
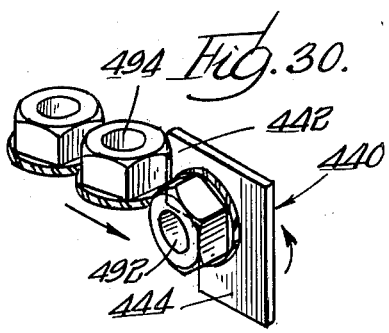
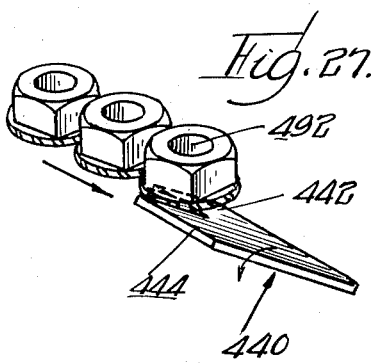
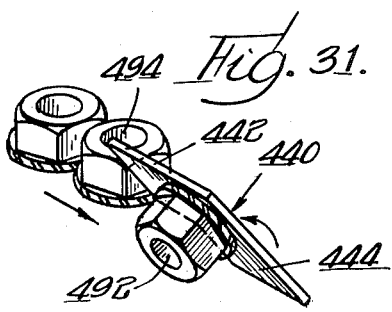

2,730,732

METHOD OF AND APPARATUS FOR ASSEMBLING NUT AND WASHER ELEMENTS

Moritz H. Nielsen, Chicago, Ill., assignor to Illinois Tool Works, Chicago, Ill., a corporation of Illinois Application March 22, 1952, Serial No. 277,973

53 Claims. (Cl. 10—155)

This invention is concerned with means for and methods of assembling fastener elements and washers, specifically nuts and lock washers.

Machines heretofore known for assembling nut elements and lock washers have been successful only in assembling loose or individual washers with nut elements. The most efficient and rapid way known at this time for feeding washers is to feed the washers in strip form. The prior machines have not been capable of assembling nuts or nut elements with lock washers in strip form and consequently the machines have been relatively slow and inefficient in operation and have required complicated and often cumbersome machinery.

An object of this invention is to provide an apparatus for and a method of assembling nut elements with washers in strip form.

A more specific object of this invention is to provide an apparatus for and a method of assembling nut elements with washers in strip form while the strip is continuously moving.

Another object of this invention is to provide an apparatus for and method of feeding adjoined strips of washers from a common coil and assembling the strips with a succession of nut elements.

A more specific object of this invention is to provide an apparatus for and a method of feeding adjoined strips of lock washers from a common spiral coil and assembling the washer strips with a succession of nut elements.

I have found that when two or more adjoined strips of washers are wound in a single spiral coil that there is practically no tendency for the strips to pop from the coil in a direction generally longitudinally of the coil. This allows higher operational speeds as there is practically no danger of lateral movement of the adjoined strips due to popping of the strips from the coil and attendant entangling of the turns of the coil and fouling of the feeding mechanism.

This invention contemplates the assembling of nut elements with a strip of lock washers of the type having radially extending, twisted teeth wherein confronting teeth of adjacent washers are integrally joined by a narrow section of metal. The individual strips are arranged in parallel rows, two in number in the illustrative embodiment, and confronting teeth of corresponding washers in the parallel strips similarly are adjoined by a narrow section of metal. The strips are punched integrally from a single sheet of metal and the strips of washers are heat-treated and hardened following the punching operation with the result that the interconnecting metal sections are capable of being fractured.

An object of this invention is to provide an apparatus for and method of positively feeding strips of adjoined lock washers by engaging the bodies of successive washers from within the central apertures of the washers.

Another object of this invention is to provide an apparatus for and a method of continuously separating adjoined strips of adjoined lock washers while continuously feeding the strips.

A further object of this invention is to provide a mechanism for selecting nut elements having a central axially extending skirt or flange on one end surrounded by a circular recess, which mechanism passes nut elements having the flange and recess oriented in a given direction and rejects nut elements oriented in the opposite direction.

Another object of this invention is to provide an apparatus for assembling nut elements with a strip of washers wherein the assembled nut elements and washer strip are positively fed at the point of assembly.

Another object of this invention is to provide an apparatus for and method of assembling nut elements with a strip of washers and then separating the assembled nut elements and washers from the strip.

A further object of this invention is to provide an apparatus for continuously assembling nut elements and a strip of washers and continuously separating the assembled nut elements and washers from the strip.

Other objects and advantages of the present invention will be understood from the following specification when read in conjunction with the accompanying drawings in which similar numbers are utilized to designate similar parts throughout and wherein:

Fig. 1 is a side view of a machine embodying the principles of my invention;

Fig. 2 is a plan view of a double washer strip acted upon by the machine;

Fig. 3 is an enlarged side view partly in section of the nut element detector;

Fig. 4 is a plan view of the machine shown in Fig. 1;

Fig. 5 is a horizontal longitudinal view taken along the line 5—5 in Fig. 1;

Fig. 6 is an end view of the machine taken from the right end of Fig. 1;

Fig. 7 is a cross sectional view through the washer strip separator and substantially along the line 7—7 in Fig. 1;

Fig. 8 is a top view of the nut selector on an enlarged scale;

Fig. 9 is an enlarged longitudinal sectional view of the nut selector taken substantially along the line 9—9 of Fig. 8;

Fig. 10 is a cross-sectional view through the nut selector as taken along the line 10—10 in Fig. 9;

Fig. 11 is a view mostly in cross section of the nut selectors and driving mechanism therefor taken substantially along the line 11—11 in Fig. 1;

Fig. 12 is a view on an enlarged scale showing the interfitting of the nut selector and a properly oriented nut as taken substantially along the line 12—12 of Fig. 9;

Fig. 13 is a cross-sectional view of the telescoping or swaging mechanism as taken substantially along the line 13—13 of Fig. 1;

Fig. 14 is a view of the swaging mechanism in longitudinal section substantially along the line 14—14 of Fig. 13;

Fig. 15 is a longitudinal view through the swaging section taken substantially along the line 15—15 of Fig. 13;

Fig. 16 is a cross-sectional view through the swaging mechanism as taken substantially along the line 16—16 of Fig. 15;

Fig. 17 is a longitudinal section through the separating mechanism as taken substantially along the line 17—17 of Fig. 15;

Fig. 18 is a cross-sectional view through the moving part of the separating mechanism as taken substantially along the line 18—18 of Fig. 15;

Fig. 19 is an enlarged perspective view showing the interconnection between adjacent washers of a strip;

Fig. 20 is an enlarged sectional view through the swaging mechanism and illustrating the operation thereof, the view being taken substantially along the line 20—20 of Fig. 13;

Fig. 21 is a view looking substantially radially inwardly on the swaging wheel;

Fig. 22 is a cross-sectional view taken along the line 22—22 in Fig. 20 and showing the swaging of a nut element;

Fig. 23 is a cross-sectional view showing the completed assembly of a nut element and lock washer; and Figs. 24–31 are somewhat diagrammatic views in perspective showing the sequence as a completed assembly is separated from the remainder of the washer strip.

Referring first to Figs. 1 and 4–6 for an understanding of my invention, there will be seen a spiral coil 50 from which an adjoined, double strip 52 of washers leads to a positive washer feeding mechanism 54. The double washer strip continues on to a washer strip slitting mechanism 56 which separates the double washer strip 52 into a pair of identical strips 58 and 58a.

A pair of nut element hoppers 60 and 60a of similar construction is positioned at the top of the machine and the hoppers feed nuts down similar chutes 62 and 62a to nut element selectors 64 and 64a of similar construction. Selected nut elements then pass down feed chutes 66 and 66a to a telescoping or swaging mechanism 68 at which point the nut elements are assembled with the washers of the strips 58 and 58a.

The assembled nut elements and washers then pass on to a separating mechanism 70 at which point each finished assembly consisting of lock washer and nut element is separated from the remainder of the strip to which the washer previously was joined. Each finished assembly then passes gravitationally through a tube 72 to a receptacle 74.

Each washer 76 (Fig. 2) in the strips 52 and 58 and 58a is of the type having radially extending, twisted teeth. Confronting teeth of adjacent washers are interconnected or adjoined by narrow sections of metal 78 and confronting teeth of adjacent, corresponding washers of the strips 58 and 58a are interconnected and adjoined by narrow sections of metal as at 80 to form the double strip 52. The adjoined ends of the washer teeth are twisted in opposite directions so that the interconnecting metal sections 78 and 80 are quite thin. The double washer strip 52 is heat-treated after formation and this makes the metal forming the washers quite hard and stiff. The thinness and the hardness and stiffness of the metal sections 78 and 80 makes these sections relatively fracturable by relatively moving adjacent washers.

The double strip 52 is supplied in the form of a spiral coil 50 wrapped on a solid core 82 (Fig. 1). A circular plate 84 (Figs. 1 and 4) is fixed on the end of the core 82 and helps to hold the double strip 52 in the spiral coil 50. A support 86 upstanding from a base 88 is provided with a stub shaft 90 rotatably supporting the core 82. The upstanding support 86 acts in cooperation with the circular plate 84 to provide all the support or bracing that is necessary for the coil 50. The lateral stability imparted to the strip 52 by the duplicate formation thereof prevents the turns of the strips 52 from popping out of the coil 50 and away from plate 84, and the increased resistance to unwinding of the coil is avoided.

The positive washer feeding mechanism 54 is supported by a subframe 92 carried by main frame 94. The washer feeding mechanism comprises a disc 96 fixed on a shaft 98 carried at either end by a pair of brackets 100 bolted to the subframe 92. A sprocket wheel 102 also is fixed to the shaft 98 for rotating the same and is driven by a sprocket chain 104. The disc is provided with two rows of radially extending, peripheral fingers 106 properly spaced to fit in the central apertures of adjacent, adjoined washers.

A metal bracket 108 upstanding from the brackets 100 has an overlying top plate 110 formed with a rearwardly protruding finger 112 for maintaining the double strip 52 in engagement with the disc 96. Similarly, a rearwardly extending bracket 114 is provided with a transverse guide section 116 for holding the strip 52 down as it approaches the disc 54 to insure proper engagement of the protruding fingers 106 with the strip 52. A hollow, tube-like member 117d rectangular cross section receives the double strip 52 for feeding from the disc 96, without buckling.

*The washer strip splitting mechanism*

From the positive feeding mechanism 54 the double washer strip 52 continues on to the washer strip splitting mechanism 56. The strip is pulled forwardly by the telescoping or swaging mechanism 68 as will be apparent hereinafter and also is pushed from the rear by the disc 96. The tube-like member 117 prevents the pushing from buckling the strip. The splitting mechanism 56 comprises a pair of brackets 118 bolted or otherwise suitably secured to the subframe 92. The brackets 118 rotatably support a shaft 120 on which is rotatably mounted a splitting wheel 122. The splitting wheel 122 as best may be seen in Fig. 7 is provided at its opposite ends with predetermined minor diameters 124 and at its mid portion with a major diameter 126 greater than the diameters 124. The periphery of the splitting wheel thus is in the form of a pair of conical frustums. Accordingly, the periphery presents a pair of frusto-conical bearing surfaces 128.

A pair of cylindrical posts 130 (Fig. 1) extends upwardly from each of the brackets 118 and each of the posts 130 has a reduced end portion 132 threaded at its upper end for receipt of a nut 134 bearing down against a bracket 136. Coil springs 138 are compressed between the shoulder at the bottom end of the reduced portion 132 and the bracket 136. The height of the brackets 136 can be adjusted by tightening the nuts 134 to force the brackets down against the spring 138, or by loosening the nuts 134 to allow the springs 138 to raise the brackets.

A shaft 140 extends between the brackets 136 and carries a presser wheel 142. The presser wheel 142 as best seen in Fig. 7 comprises a pair of rims 144 lying on either side of the splitting wheel 122. Frusto-conical pressing surfaces 146 extend inwardly from the rims 144 and are complementary to the frusto-conical surfaces 128 of the splitting wheel 122. The frusto-conical surfaces 146 are axially spaced apart a short distance and are interconnected by a cylinder 148 of reduced diameter. The diameter of the cylinder 148 is sufficiently small to provide clearance for the major diameter 126 for the splitting wheel 122.

As may be seen in Fig. 7, the complementary frusto-conical surfaces 146 of the presser wheel and 128 of the splitting wheel cooperate to bend the strip 52 along its longitudinal axis. This snaps the adjoining metal sections 80 or at least weakens them to such an extent that they are broken by a slight sideways pull on each of the strips 58, 58a away from the longitudinal axis of the strip 52. A sufficient sideways pull is provided by a pair of guide rollers 150 and 150a (Fig. 5). The rollers 150 and 150a are of similar construction and are supported by arms 152 and 152a pivotally connected to a bracket 154 on an upstanding part 156 of the main frame 94. The weight of each roller 150, 150a and its supporting arm 152 is sufficient to hold the roller down against the corresponding strip 58 or 58a, and each roller is provided with side flanges or rims 156 to guide the strips 58 and 58a away from one another.

Each of the arms 152, 152a carries a safety switch 158 (only one being shown) supported by a bracket 160. Each switch 158 conveniently may be of the mercury switch type and is connected by a wire or wires 162 to a relay controlling the driving motor for the machine. Exhaustion of the spiral coil 50 or breakage of either of the strips 58 or 58a allows one or both of the rollers 150 or 150a to drop. This causes actuation of the corresponding switch 158 which effects stopping of the main drive motor of the machine until the washer strip coil 50 can be replenished or the continuity of the strips 58, 58a restored.

The nut element hoppers

The nut hoppers 60 and 60a are of identical construction and consequently the details of the hopper 60 only will be disclosed. The hopper 60 (Figs. 1, 4, and 6) is of conventional construction and includes a pedestal 162 supporting a generally cylindrical casing 164 having an inturned lip or flange 166 defining a central opening 168. The hopper further includes a fixed central plate 170 on which is fixed a block 172 supporting the nut element feed chute 62 with its upper end adjacent the inner rim of a frusto-conical ring 174. The ring is provided with substantially radial grooves 176 lying along elements of the conical frustum 174. The ring 174 is rotatably driven by an electric motor 178 mounted on a bracket 180 on the pedestal 162, the motor acting through suitable gearing 182. Nut elements dumped loosely in the hopper are picked up in the grooves 176 as the grooves are moved through the lowest portion of the hopper 60 and are raised toward the end of the chute 62 by continued rotation of the ring 174. A curved guard plate 184 fixed on the central plate 170 along the inner edge of the ring 174 maintains nut elements in the grooves 174 until each groove is aligned with the chute 62 at which time the nut elements slide from the groove into the chute.

Each of the tracks 62 and 62a is of similar and conventional construction. Referring to the track 62a for illustrative example, and specially to Figs. 8 and 9, the track may be seen to comprise a channel-shaped member with longitudinal edge walls or flanges 186a interconnected by a web or floor 188a. The web and flanges together define a channel through which nut elements are adapted to slide gravitationally with either face in contact with web 188a. A retaining strip 190a is secured on one of the flanges 186a and partially overlies the channel positively to retain the nut elements in the channel.

The nut element selectors

The nut element selectors 64 and 64a are of similar construction and each includes a block or base 192, 192a (see particularly Figs. 8–11) supported by a pair of bracket arms 194, 194a bolted or otherwise suitably secured to the frame 156. A short, transverse cross shaft 196, 196a is supported centrally of each pair of bracket arms 194, 194a. Each shaft is journaled in a bearing 198, 198a in one of each pair of bracket arms. Selector drive pulleys 200, 200a are pinned or otherwise fixed on the confronting ends of the shafts 198 and 198a and hubs on the pulleys are spaced from the adjacent arms 194 and 194a by means of ring-like spacers 202, 202a. A back-up plate 204, 204a is pinned to each of the shafts on the opposite side of the respective bracket arm from each pulley 200, 200a and prevents axial movement of the shaft. A pin wheel 206, 206a is loosely mounted on each shaft 196, 196a and is provided with a plurality of radially extending pins 208, 208a arcuately spaced about its periphery. The shank 210, 210a of each pin extends into an open circular channel 212, 212a where the inner end of the shank is exposed for engagement by a tool to force the pin from its seated position if it must be replaced due to damage or otherwise.

Each nut element 214 (Fig. 12) is provided with an axially extending flange or skirt 216 surrounding the central aperture 218, and a circular groove 220 surrounds the flange or skirt 216. Each pin, as 208 in Fig. 12, is provided with an enlarged head 222 having a rounded off central boss 224 adapted to fit into the central aperture of each nut element 214. A rounded off peripheral flange 226 is spaced from the boss 224 by a groove 228. The groove 228 is adapted to receive the nut element skirt 216 while the pin head flange 226 fits into the circular groove 220 of the nut element.

A driving clutch member 230, 230a (Fig. 11) is axially shiftable on each shaft 196, 196a but is locked against rotation relative thereto by a key 232, 232a. Each driving clutch member includes inner and outer cylindrical portions 234, 234a and 236, 236a spaced apart by a disc 238, 238a integral therewith. The outer cylinder 236, 236a of each driving clutch member is rotatably mounted in a suitable aperture in one of the bracket arms 194, 194a, while the inner cylinder is keyed to the shaft. A ring 240, 240a of friction material is carried by each disc 238, 238a of the driving clutch members and is urged against the corresponding pin wheel 206, 206a by a coil spring 242, 242a surrounding each inner cylinder 234, 234a and trapped by a washer 244, 244a held in place by a nut 245, 245a threaded on the end of the shaft.

Drive belts 246 and 246a are passed over the pulleys 200 and 200a and over drive pulleys 248 on the output shaft of a speed reducer 250. The speed reducer is driven by an electric motor 252 (Figs. 4 and 6), both said motor and speed reducer being suitably mounted on the upstanding frame part 156.

The lower end of each nut element feed chute 62, 62a is received in the block 192, 192a. The lower ends of the chutes 62 and 62a are closer together than the upper ends while the nut element selectors are parallel. Accordingly, each of the chutes enters the corresponding block 192, 192a at an angle from the opposite side. In order to secure the end of the chute in this position, each block is cut at an angle as at 248a (Fig. 8) while a wedge 250a is drawn against the chute 62a by a bolt 252a passing through the wedge.

Each block 192, 192a is provided with a longitudinal groove or channel 254, 254a adapted to receive the nut elements 214 from the respective chute 62, 62a. A transverse strap 256, 256a is secured across the groove or channel and across the lower end of the corresponding chute 62, 62a by means such as screws 258a illustrated in Fig. 8. A hold-down plate 260, 260a fits on top of the corresponding block 192, 192a and is properly positioned thereon by locator pins illustrated at 262a in Figs. 8 and 9. A pair of coil springs 264, 264a holds each hold-down plate down. Each spring 264, 264a surrounds a screw or bolt 266, 266a. The locator pins and spring holding screws fit through the hold-down plates 260, 260a to allow these plates to shift upwardly slightly against the action of the springs. The nut element selectors further include guide plates 268 and 268a fixed to the tops of the blocks 192, 192a by means such as screws illustrated at 270a in Figs. 9 and 10 which screws conveniently may pass through the upper ends of the respective chutes 66 and 66a to hold them in recesses in the blocks 192, 192a. The lower portion of each hold-down plate 260, 260a is provided with a slot or groove 272, 272a of proper width to receive the nut flanges or skirts 216. This slot widens out into a deflecting slot or groove 274, 274a in the corresponding guide plate 268, 268a. A lateral, oblique groove 276, 276a underlies each slot 274, 274a and extends progressively downwardly as it extends toward the edge of the block 192, 192a. Each slot 274, 274a and associated groove 276, 276a is sufficiently wide to accommodate the nut elements 214.

The periphery of each pin wheel 206, 206a fits into an arcuate channel illustrated at 278a in Fig. 9.

Operation of the two nut element selectors 64 and 64a is similar. Referring to the nut element selector 64a as shown in Figs. 8–11 for an understanding of the operation of the nut element selectors, it will be seen that rotation of the pulley 200a by the belt 246a driven by the electric motor 252 causes rotation of the shaft 196a. The shaft 196a drives the driving clutch member 230a which acts through the friction material 240a to drive the pin wheel 206a. The pins 208a are properly spaced for the central bosses 224a of the heads 222a to fit into the central apertures of successive nut elements. Nut elements which are positioned with the flanges or skirts 216a down interfit with the pin heads as shown in Fig. 10 and pass straight down the channel 254a. Passage down the channel is facilitated by a central groove 278a in the bottom of the channel 254a in the lower part of the block, which central groove is of sufficient width to accommodate the flanges or skirts of the nut elements.

Nut elements which are positioned with their skirts directed upwardly do not interfit with the heads of the pins and consequently these nut elements are lifted by the pin heads against the hold-down plate 272a which rises against the action of springs 264a. The raised nut elements do not fit beneath the guide plate 268a, but instead extend up into the deflecting slot 274a and are deflected to one side to slide through the groove 276a.

Nut elements which are deflected to the side in the selectors 64 and 64a pass into tubes 280 and 280a (Figs. 1, 4, and 6) which are joined together to form a common tube 282 (Figs. 1, 5, and 6) leading to a receptacle 284 (Fig. 1) supported by a portion of the machine frame 94.

The friction clutch drive of each pin wheel 206, 206a prevents damage to the mechanism in case of a jam. Operation of the machine without a proper supply of nut elements is prevented by nut element detectors 286 and 286a (Figs. 1 and 6) mounted adjacent the chutes 66, 66a. The chutes 66 and 66a are similar in construction to the chutes 62 and 62a and detailed description is believed unnecessary. The nut element detectors 286 and 286a are similar in construction and operation. The detector 286 may be seen in Fig. 3 to comprise a casing 288 in which is mounted a switch 290 having connecting wires 292. A switch actuating plunger 294 is normally urged outwardly from the switch through a suitable opening in the casing 288. A detector arm 296 is pivotally mounted at 298 on an ear 300 on the casing 288 and abuts the switch actuating plunger 294. The free end of the detector arm 296 is rounded at 302 and rides along the top faces of the nut elements 214 passing through the chute 66. If the nut element supply is interrupted for any reason, the arm 296 drops and the switch actuating plunger 294 is free to move outwardly to actuate the switch 290. The switch 290 acts through suitable relay connections (not shown) to shut off the main driving motor to stop the operation of the machine until the continuity of the nut element supply can be restored.

*The telescoping or swaging mechanism*

The telescoping or swaging mechanism 68 includes a bracket 304 (Figs. 1, 13, and 14) on the main frame 94. The bracket supports a pair of side plates 306 and 306a. A cross shaft 308 is journaled in a bearing 310 in the side wall 306a and also is journaled in a bearing 312 fixed in a bearing carrier 314 secured by means such as screws 316 in the plate 306. A worm wheel 318 having a long hub 320 is keyed on the cross shaft 308 substantially midway between the plates 306 and 306a and meshes with a worm 322 for driving the cross shaft 308. A gear 324 is fixed on the shaft 308 adjacent one end of the hub 320 by suitable keying means.

Swaging wheels 326 and 326a are fixed on substantially opposite ends of the shaft 308 and immediately adjacent the remotely disposed faces of the side walls 306 and 306a. Both of the swaging wheels are suitably keyed to the shaft 308 for rotation therewith and the swaging wheel 326a is held on the shaft by a washer 328 and nut 330 theaded on the end of the shaft. The swaging wheel 326 is held substantially on the other end of the shaft by a washer 332 and a sprocket wheel 334 pinned to the reduced end 336 of the shaft.

The swaging wheels 326 and 326a are of similar construction and the construction of the wheel 326 may be seen in detail in Figs. 15 and 20-22. Each wheel is provided with a plurality of swaging pins 328 equally, arcuately spaced about its periphery. The shanks 330 of the pins extend radially inwardly and terminate in holes 332 formed in the side of the wheel. The exposed inner ends of the shanks facilitate removal of the pins for replacement if damaged or for any other reason.

The pins 328 are provided with enlarged heads 334 partially countersunk in the periphery of the wheel 326. The periphery of the wheel is formed with interconnected, substantially circular removed portions 336 shaped to receive the washer strip 58.

The pin heads 334 are centrally located in the relieved portions 336 and have frusto-conical swaging surfaces 338 exposed and leading up to locator tips 339 rounded off at 340 at the upper end. The locator tips 339 are of proper diameter to fit within the central apertures 218 of the nut elements 214 while the swaging surfaces 338 spread the nut element skirts or flanges 316 permanently to trap the washers on the nut elements as will be apparent hereinafter.

A pair of side blocks 342 and 342a is positioned above the plates 306 and 306a. Pairs of tension rods 344 and 344a extend down through the side blocks 342, 342a and are threaded at their lower ends into the plates 306, 306a. The tension rods also are threaded at their upper ends and nuts 346 and 346a are threaded thereon and hold washers 348 and 348a against compression springs 350 and 350a. These springs normally urge the blocks 342, 342a down toward the plates 306, 306a and the blocks are positioned relative to these plates by set screws 352 and 352a threaded in the blocks in bores 354a (the bores being illustrated only in the block 342a) threaded at the lower ends and countersunk at the upper ends.

A cross shaft 356 is rotatably carried by the blocks 342, 342a, being journaled in suitable sleeve bearings 358 and 358a. A drive gear 360 is keyed on the shaft 356 adjacent the block 342a and abutting a flange on the sleeve bearing 358a. The gear 360 meshes with the gear 324 for rotating the shaft 356 in timed relation to the shaft 308. Back-up or tamping wheels 362 and 362a are keyed on the ends of the shaft 356 and are secured against flanges on the bearings 358 and 358a by washers 364 and 364a and nuts 366 and 366a threaded on reduced end portions of the shaft. The tamping wheels 362 are in parallel planes with the swaging wheels 326 and are adapted to back up or tamp the nuts against the swaging pins 328 as will be apparent hereinafter.

Provision has been made for raising the tamping wheels 362, 362a away from the swaging wheels 326, 326a against the action of the springs 350, 350a. This includes a plate 368 supported on shoulder portions formed by reduced upper ends 370 and 370a on the tension rods 344 and 344a. Nuts 372 and 372a threaded on these reduced upper ends hold the plate 368 tightly against the shoulders. A pull rod 374 extends loosely through an aperture 376 in the center of the plate 368. A nut 378 is threaded on the upper end of the pull rod 374 and bears against a spacer 380 which serves to hold the nut 378 relatively clear of the upper ends 370, 370a of the tension rods 344, 344a. The lower end of the pull rod 374 is provided with a reduced portion 382 which is threaded into a lifting member 384. The lifting member is provided with an oblong transverse aperture 386 through which the cross shaft 356 passes. The oblong shape of the aperture allows up and down movement of the cross shaft 356 as the tamping wheels 352, 352a engage and stamp successive nut elements.

When it is desired to raise the cross shaft 356 to pull the tamping wheels 362, 362a away from the swaging wheels 326, 326a, all that is necessary is to tighten the nut 378 on the pull rod 374. This forces the spacer 380 down against the plate 368, and as the plate 368 is fixed in elevation by the shoulders on the tension rods 344, 344a, the pull rod 374 is raised and lifts the cross shaft 356 with it.

Operation of the telescoping or swaging mechanism 68 will be apparent with regard to Figs. 15 and 20-22. The swaging wheels 326, 326a and back-up or tamping wheels 362, 362a are rotated in timed relation by the drive connections heretofore described and shown in Figs. 13 and 14, including worm and worm wheel 322 and 318, the shaft 308, gears 324 and 360, and shaft 356. Operation of both sets of cooperating, swaging and tamping wheels is identical, and accordingly, the operation of only one set need be shown. The washer strip 58 is received in the circular recesses 336 and is fed positively by engagement of the recess walls against the exterior of the washer strip. Each of the washers 76 of the strip 58 is provided with radially extending, twisted locking teeth 386. Confronting teeth 386 of adjacent washers are interconnected by narrow metal sections 78 as described heretofore. The washers 76 further are provided with conical skirts or flanges 388 about the washer center holes and these skirts are spaced from the heads 334 of the swaging pins 328 by the positioning of the washers 76 of the strip 58 in the recesses 336.

The bottom edge of the nut element chute 66 is tapered or wedge-shaped as shown at 390 in Figs. 15 and 20 and is positioned between the swaging wheel 326 and tamping wheel 362. Nut elements 214 sliding down the chute drop off on to the locator tips 339 of the swaging pins 328, the pins being properly spaced to receive the nuts in abutting relation as readily may be seen in Fig. 20. The tamping wheel 362 forces the nut elements 214 down toward the swaging wheel 326. The nut element skirts or flanges 216 are slightly tapered on their outer surfaces and readily fit within the washer skirts or flanges 388 and against the frusto-conical swaging surfaces of the pin heads 334, which swaging surfaces swage the nut element skirts outwardly beneath the washer skirts as readily may be seen in Fig. 20 permanently to trap the washers on the nut elements. An assembled nut element 214 and washer 76 are shown in section in Fig. 23. The center bore 218 is adapted to be threaded before the nut element is used and it will be seen that the swaging surface of the pin head leaves the lower end of the bore beveled at 392 to facilitate positioning of the nut on a bolt or the like.

*The separating mechanism*

A stub track 394 (Figs. 15–17) is secured to the side plate 306 and a similar track (not shown) is secured to the side plate 306a. These tracks are of similar construction, one being the mirror image of the other, and accordingly, only the one track 394 will be described. The track 394 comprises an elongated angle member 396 secured to the plate 306 by means such as screws 398 and has an arcuate edge 400 positioned closely adjacent to the swaging wheel 326. The angle member 396 includes a flange 402 adapted to support the assembled nut elements 214 and washers 76, and a retainer strip 404 is secured along the edge of this flange by means such as screws 406. A hold-down strip 408 is secured to the plate 306 by means such as screws 410 and is spaced a sufficient distance above the flange 402 to allow the assemblies of nut elements and washers to pass thereunder. The hold-down strip 408 is provided with an arcuate relieved end 411 juxtaposed to the tamping wheel 362. The arcuate or curved ends 400 and 410 allow the track 394 to be positioned substantially between the swaging wheel 326 and tamping wheel 362 to receive the assembled nut elements and washer strip therefrom.

An upstanding plate 412 (Figs. 1, 4–6, 13–15, and 17) is secured to the front edges of the side plates 306 and 306a and to the front of the bracket 304. Twisting heads 414 and 414a are positioned near the two upper corners of the plate 412 for severing each assembly consisting of a nut element and washer from the corresponding washer strips. The twisting heads are similar in construction and the head 414 is illustrated in detail in Figs. 15, 17, and 18. The head comprises a generally cylindrical body portion 416 rotatably journaled in a bearing 418 in an aperture in the plate 412. The head is provided at one end with radially extending, peripheral flange 420 provided at its outer edge with gear teeth 422. The opposite end of the head is of reduced diameter at 424 and the reduced diameter portion 424 is provided with a restricted neck portion 426. A split ring 428 fits about the reduced diameter portion 424 and abuts the shoulder formed by the reduced diameter portion 424 with the remainder of the cylindrical body portion 416. The split ring 428 is provided with an inwardly directed flange 430 fitting into the restricted neck portion 426 and the two halves of the ring are held together by screws 432.

The twisting head 414 is provided with a central bore which is substantially cylindrical in the inlet half 434 of the head and which is frusto-conical at 436 in the outlet half.

The cylindrical portion 434 of the bore is provided with substantially diametrically spaced slots 438 and a substantially L-shaped twisting plate 440 is fixed in the slots. The plate 440 contains the rotational axis of the twisting head 414 and has one quarter removed from one corner thereof to leave a leg 442 and a foot 444. As may be seen in Fig. 15, the plate 440 when in assembly-receiving position does not lie with its upper surface in the same plane with the upper surface of the flange 402 of the track 394, but is inclined slightly downwardly, i. e. the rotational axis of the head 414 is inclined downwardly from the axis of the track 394.

The gear teeth 422 and 422a on the periphery of the head flanges 420 and 420a mesh with a large gear 446 (Figs. 1, 5, 6, 13, and 14) rotatably journaled on a stud 448 (Figs. 6, 13, and 14) having a reduced end portion 450 (Fig. 14) threaded into the plate 412. The gear 446 is spaced from the plate 412 by a washer 452. The gear 446 is driven by a gear 454 (Figs. 1, 6, 13, and 14) fixed on a shaft 456 (Figs. 13 and 14). The shaft 456 is journaled in a sleeve bearing 458 in the plate 412 and in a sleeve bearing 460 carried by a bracket 462 upstanding from the supporting bracket 304. The aforementioned worm 322 is keyed on the shaft 456 for rotation therewith and is fixed against axial displacement by a pair of lock nuts 464 threaded on the shaft, and by a pair of jam nuts 466 threaded on the shaft.

The shaft 456 is fixed against axial displacement by a collar 468 on the shaft abutting a flange on the bearing 458 and by the gear 454 which is held up against a flange on the bearing 458 by the hub 469 of a multiple pulley 470. A plurality of belts 472 (Figs. 1, 5, 6, 13, and 14), illustrated as three in number, is passed over the multiple pulley 470 and over a multiple pulley 474 (Figs. 1 and 6) on the output shaft of a speed reducing mechanism 476 driven by motor 478. The motor 478 and speed reducing mechanism 476 are carried by a bracket 480 mounted on a plate 482. The plate is pivotally connected at 484 at one end to a part of the main frame 94 and the weight of the plate, bracket, and motor and speed reducer hangs on the belts 472 which thereby are kept taut. The belts 472 further are maintained taut by a bolt 486 pivotally connected to a bracket 488 on a lower cross member of the main frame 94. The bolt extends upwardly through an aperture in the plate 482 adjacent the lowest edge thereof, and the plate is pulled down by a pair of jam nuts 490 threaded on the upper end of the bolt.

Operation of the separating mechanism best will be understood with reference to Figs. 15, 17, and 18 and to the somewhat diagrammatic views in Figs. 24–31. The washer strip 58 with the nut elements 214 assembled therewith is pushed down the track 394 by the swaging wheel 326 and into the cylindrical portion 434 of the axial bore in the twisting head 414.

With the L-shaped plate 440 in substantially horizontal or assembly-receiving position, no nut and washer attached to the strip is within the head 414 as shown in Fig. 24. As the plate 440 continues to rotate at a uniform constant rate and the washer strip with nut elements assembled therewith continues to advance at a uniform constant rate, the first assembly 492 has started to move into the cut out space adjacent the leg 442. When the plate 440 has completed a quarter revolution, the first assembly has moved half way into the notch or cut out portion adjacent the leg 442 as shown in Fig. 26. Continued movement brings the first assembly 492 and plate 440 into the relative positions shown in Fig. 27 with the assembly 492 three quarters of the way into the notch. By the time the plate 440 has completed a half revolution as shown in Fig. 28, the leading edge of the first assembly 492 has reached the end of the notch adjacent the foot 444 and the leading half of the assembly 492 is positioned part way above the leg 442. Therefore, as the plate 440 continues to rotate, the leg 442 engages beneath the assembly 492 and starts to twist it relative to the next assembly 494 as shown in Fig. 29. The foot 444 at this time helps to provide lateral stability. By the time the plate 440 has completed three quarters of a complete revolution as shown in Fig. 30, the first assembly 492 has been rotated 90° relative to the next assembly and still further rotation of the plate 440 twists the assembly 492 still farther relative to the assembly 494 as shown in Fig. 31. By the time plate 440 has completed a complete revolution back to the position shown in Fig. 24, the first assembly 492 has been twisted through 180° and this assembly has progressed to the point where its trailing edge has passed completely on to the plate 440 and the next assembly 494 is ready to move on to the plate. During the twisting of the assembly 492, twisting of the assembly 494 is prevented by the flange 402 and hold-down strip 408 of the track 394 (Fig. 16).

It readily may be seen in Fig. 19 that the interconnection 78 between confronting teeth 386 of adjacent washers 76 is relatively thin due to the opposite twisting of these teeth. Hardening of the washer strip after formation renders the interconnection 78 rather frangible, and it readily will be seen that rotation of one washer or assembly 180° relative to the next one is sure to fracture the interconnection.

*Summary of operation*

The electric motor 478 acts through the speed reducer 476, belts 472, and gearing heretofore disclosed in detail to drive the separating mechanism 70 and the telescoping or swaging mechanism 78. The sprocket wheel 334 is driven by the same means and acts to drive the sprocket chain 104.

The sprocket chain 104 is maintained taut by an idler sprocket 496 (Fig. 1) carried by a bracket 498 mounted on subframe 92 by means of a clamping bolt 500. Suitable keying means (not shown) is provided for preventing rotation of the bracket 498 about the bolt 500, and the bolt acts to clamp the bracket in adjusted position with the idler sprocket 496 bearing against the chain 104 laterally.

The sprocket chain drives the positive feed mechanism 54 which pulls the double washer strip 52 from the coil 50 and pushes it onto the washer strip splitting mechanism 56. The washer strip splitting mechanism 56 acts to bend laterally adjacent washers oppositely about the axis containing the lateral interconnections substantially to sever the double strip 52 into the two strips 58 and 58a as set forth earlier in considerable detail. If the splitting mechanism 56 does not entirely sever each interconnecting section of metal, the severing is completed by the spreading apart of strips 58 and 58a by the rollers 150 and 150a (Fig. 5) and by the spacing between the two strips as they enter the swaging mechanism 68.

The nut element hoppers 60, 60a are driven by the motor 178 and the speed of the hoppers can be adjusted by varying the speed of the motor 178. Nut elements pass from the hoppers 60, 60a down the chutes, 62, 62a under the influence of gravity to the nut element selectors 64, 64a. The nut element selectors are driven by the motor 252 (Fig. 4) at an adjustable rate of speed and are effective to pass nut elements with their skirts downwardly directed down the chutes 66, 66a, while discharging nut elements with their skirts upwardly directed down the tube 282 to the receptacle 284.

The nut elements are brought into telescopic association with the washers of the strips 58 and 58a by the telescoping or swaging mechanism 68 and the assemblies so formed are successively and continuously twisted from the strips by the separating mechanism 70. The separated and individual assemblies then drop through the tube 72 into the receptacle 74. It will be understood that the tube 72 either is a Y-shaped tube receiving assemblies from both the twisting heads 414, 414a, or is a pair of tubes performing the same function.

The assembly of nut elements with a strip of washers, particularly a strip moving at a uniform, constant rate provides for more rapid assembly of nut elements and washers than has heretofore been thought possible. The use of the double strip of washers increases the speed of production not only due to the duplicate assembly, but also due to the great lateral stability of the double strip which allows the double strip to be fed from the spiral coil at a greater rate than a single strip with no danger of lateral shifting of the strip and consequent popping out of the strip from the spiral coil axially of the spiral. The inherent stiffness of the double strip is of further advantage in that the strip can be continuously fed through heat treating apparatus for hardening prior to being coiled without having the strip buckle or otherwise move from its desired path while being treated.

The rapid feeding of the washer strip or strips further is facilitated by the positive feed of the double strip prior to splitting and of the individual strips by the telescoping or swaging mechanism after splitting.

The continuous splitting of the double strip into individual strips by the simple bending of the strips slightly in opposite directions further facilitates the rapid rate of feed, while the continuous twisting off of the finished nut element and washer assemblies insures positive separation of the assemblies at a relatively high speed.

The convergence of the nut elements and washer strips and the swaging of the nut element skirts concurrently with their telescopic assembly with the washers of the strips speed assembly and contribute to the high rate of production.

The single apparatus shown and described in this application will be understood as being an illustrative embodiment and not a limitation on the invention. The invention includes all that which falls fairly within the spirit and scope of the appended claims.

I claim:

1. Apparatus for producing washer and nut element assemblies comprising means for feeding a strip of washers along a predetermined path, means for bringing a succession of nut elements into telescopic association with the washers in said strip, means for coupling each telescoped washer and fastener element to form a unit assembly, means engaging the washers of the assemblies so produced for separating the telescoped nut elements and washers from said strip, means for feeding said assemblies from the telescoping means to the separating means, and means for operating both of said feeding means, said telescoping means, and said separating means in proper time relation.

2. Apparatus for producing washer and fastener element assemblies comprising means for feeding a plural strip of washers along a predetermined path, means for longitudinally separating the strip to form separate washer strips, means for bringing a succession of fastener elements into telescopic association with the washers in said strips, means for coupling each telescoped washer and fastener element to form a unit assembly, and means for separating the assemblies so formed from one another.

3. Apparatus for producing washer and fastener element assemblies comprising means for feeding a plural strip of washers along a predetermined path, means for separating said plural strip into a plurality of separate strips, means for telescopically assembling fastener elements with the washers of said strips, means for coupling each telescoped washer and fastener element to form a unit assembly, and means for separating the assemblies so produced from said strips.

4. Apparatus for producing washer and fastener element assemblies comprising means for supporting a plural strip of washers along a predetermined path at a uniform constant rate, means for continuously separating said plural strip of washers into a plurality of individual strips, means for feeding the individual strips along predetermined paths at said uniform constant rate, means for assembling fastener elements with the washers of said strips as said strips are fed at said uniform constant rate, and means for continuously separating successive assemblies so formed from said strips as said strips are fed at said uniform constant rate.

19. Apparatus for producing unit assemblies of washers and fastener elements comprising means for feeding a plural strip of washers along a predetermined path at a uniform constant rate, means for continuously separating said plural strip into a plurality of individual strips, means for feeding said individual strips along a plurality of predetermined paths at said uniform constant rate, means for assembling fastener elements with the washers of said strips as said strips are fed at said uniform constant rate, and means for continuously twisting successive assemblies so formed about the axes of said strips to separate the assemblies.

20. Apparatus for producing unit assemblies of washers and nut elements of the type having axially extending skirts comprising means for feeding a plural strip of washers along a predetermined path at a uniform constant rate, means for continuously separating said plural strip into a plurality of individual strips, means for feeding said individual strips along predetermined paths at said uniform constant rate, means for bringing nut elements having axially extending skirts into telescopic association with the washers of said strip, means for swaging the skirts of said nut elements permanently to trap a washer on each nut element to form an assembly, and means for continuously twisting successive assemblies from said strips, all while said strips are fed at said uniform constant rate.

21. The method of producing unit assemblies of washers and nut elements which comprises feeding an integral strip of washers over a predetermined path, telescopically assembling nut elements with the washers in said strip, and successively engaging only the washers to twist the assemblies so formed from the plane of said strip to fracture said assemblies from said strip.

22. The method of producing unit assemblies of washers and nut elements which comprises feeding a plural strip of washers along a predetermined path, separating the strip longitudinally to form separate washer strips, telescopically assembling a succession of fastener elements with the washers in said strips, and separating the assemblies so formed from said strips.

23. The method of producing unit assemblies of washers and nut elements which comprises feeding a plural strip of washers along a predetermined path, splitting said plural strip into a plurality of separate strips, telescopically assembling a plurality of fastener elements with the washers in said strips, and separating the assemblies so formed from said strips.

24. The method of producing unit assemblies of washers and fastener elements which comprises feeding a plural strip of washers over a predetermined path from a spiral coil, separating said plural strip into a plurality of individual strips, telescopically assembling fastener elements with the washers in said strips, and separating the assemblies so formed from said strips.

25. The method of producing washer and fastener unit assemblies which comprises feeding a plural strip of longitudinally and laterally interconnected washers over a predetermined path, bending the lateral interconnections substantially to fracture the same for severing said plural strip into a plurality of individual strips, telescopically assembling fasteners with the washers of said strips, and fracturing the longitudinal interconnections to separate the assemblies so formed from said strips.

26. The method of producing washer and fastener element assemblies which comprises feeding a double strip of longitudinally and laterally interconnected washers over a predetermined path, oppositely bending successive laterally adjacent washers substantially to fracture the lateral interconnections for splitting said double strip into two individual strips, telescopically assembling fastener elements with the washers of said strips, and separating the assemblies so formed from said strips.

27. Apparatus for producing unit assemblies of nut elements and washers, comprising means for feeding a strip of washers along a predetermined path, means for feeding a succession of nut elements along a predetermined path relatively converging with the predetermined path of the strip of washers and in timed relation with said washers, means for bringing successive nut elements and washers into telescopic association, means for coupling each telescoped washer and nut element to form a unit assembly, and means engageable with the washers of the assemblies so produced for twisting and separating said assemblies from said strip.

28. Apparatus for producing unit assemblies of nut elements and washers, comprising positive feed means engaging the washers of a strip for positively feeding a strip of washers along a predetermined path, means for feeding a succession of nut elements along a predetermined path at least in part substantially aligned with and relatively converging with the predetermined path of said strip of washers and in timed relation with said washers, means for bringing successive nut elements and washers into telescopic association, means for coupling each telescoped washer and nut element to form a unit assembly, and means for separating the assemblies so formed from said strip.

29. Apparatus for producing unit assemblies of nut elements and washers, comprising positive feed means for positively feeding a plural strip of washers along a predetermined path, means adjacent said path for separating said plural strip into a plurality of single strips, means for feeding said single strips along predetermined paths, means for feeding successions of nut elements along predetermined paths relatively converging with the paths of said single strips and in timed relation to the washers in said strips, means for bringing successive nut elements and washers in said paths into telescopic association, means for coupling each telescoped washer and nut element to form a unit assembly, and means for separating the assemblies so formed from said strips.

30. Apparatus for producing nut element and washer assemblies, comprising means for feeding a strip of washers along a predetermined path, means for feeding a succession of nut elements in timed relation to said washers along a predetermined path converging with the path of said strip, means for axially aligning successive nut elements and washers, and means for applying an axial swaging force to said aligned nut elements and washers to deform at least one of each aligned nut element and washer for maintaining the same in permanently assembled relation.

31. Apparatus for producing unit assemblies of nut elements and washers, comprising means for feeding a strip of washers along a predetermined path at a uniform constant rate, means for feeding a succession of nut elements along a predetermined path relatively converging with the predetermined path of the strip of washers and in timed relation with said washers, positive means for telescoping and interlocking succesive nut elements and washers while said strip is fed at said uniform constant rate, and means for separating the assemblies so produced from said strip while said strip is fed at said uniform constant rate.

32. Apparatus for producing assemblies of nut elements and washers, comprising means for feeding a strip of washers along a predetermined path at a uniform constant rate, means for feeding a succession of nut elements along a predetermined path relatively converging with the preplural strip of washers in a coil, means for feeding said plural strip over a predetermined path from said coil, means for longitudinally separating the strip to form separate washer strips, means for telescopically assembling fastener elements with the washers of said strips, and means for separating the assemblies so produced from one another.

5. Apparatus for producing washer and fastener element assemblies comprising means for supporting a double strip of washers in a spiral coil, means for feeding said double strip of washers over a predetermined path from said spiral coil, means positioned adjacent said path for splitting said double strip into two separate strips, means for telescopically assembling fastener elements with the washers of said strips, and means for separating the assemblies so formed from said strips.

6. Apparatus for producing washer and fastener element assemblies comprising means for feeding a plural strip of adjoined washers over a predetermined path, said washers being longitudinally interconnected in strips and the corresponding washers of said strips being laterally interconnected, means along said path for bending the lateral interconnections substantially to fracture the same for separating said plural strip into individual strips, means for telescopically assembling fastener elements with the washers of said strips, and means for fracturing the longitudinal interconnections to separate the assemblies so formed from said strips.

7. Apparatus for producing washer and fastener element assemblies comprising means for feeding a double strip of adjoined washers over a predetermined path, said washers being longitudinally interconnected in strips and the corresponding washers of said strips being laterally interconnected, means positioned adjacent said path for bending each of the strips comprising said double strip about an axis parallel to its longitudinal axis substantially to fracture the lateral interconnections for separating said double strip into a pair of strips, means for telescopically assembling fastener elements with the wahers of said strips, and means for separating the assemblies so formed from said strips.

8. Apparatus for producing assemblies of fastener elements and washers comprising means for feeding a double strip of adjoined washers over a predetermined path, said washers being longitudinally interconnected in strips and the corresponding washers of said strips being laterally interconnected, means along said path for oppositely binding successive corresponding washers of said strips about an axis containing the lateral interconnections substantially to fracture said lateral interconnections for splitting said double strip into individual strips, means for telescopically assembling fastener elements with the washers of said strips, and means for separating the assemblies so formed from said strips.

9. Apparatus for producing unit assemblies of fastener elements and washers comprising means for feeding a double strip of adjoined washers over a predetermined path, said washers being longitudinally interconnected in strips and the corresponding washers of said strips being laterally interconnected, roller means intersecting said path and rotatable about axis means substantially perpendicular to said predetermined path for bending the lateral interconnections substantially to separate said strips, means for telescopically assembling fastener means with the washers of said strips, and means for separating the assemblies so formed from said strips.

10. Apparatus for producing unit assemblies of fastener elements and washers comprising means for feeding a double strip of adjoined washers along a predetermined path, said washers being longitudinally interconnected in strips and corresponding washers of said strips being laterally interconnected, opposed roller means on opposite sides of the plane of said path and having complementary, substantially frusto-conical opposed surfaces for bending successive opposed washers about an axis through the lateral connections subtantially to sever said connections to separate said double strip into individual strips, means for telescopically assembling fastener elements with the washers of said strips, and means for separating the assemblies so formed from said strips.

11. Apparatus for producing unit assemblies of fastener elements and washers comprising means for feeding a double strip of adjoined washers along a predetermined path, said washers being longitudinally interconnected in strips and corresponding washers of said strips being laterally interconnected, opposed roller means on opposite sides of the plane of said path and having complementary, substantially frusto-conical opposed surfaces for bending successive opposed washers about an axis through the lateral interconnections substantially to sever said interconnections to separate said double strip into individual strips, means for feeding fasteners having dissimilar ends along predetermined paths, each fastener with a predetermined end oriented toward said washer strips, means for telescopically assembling said fasteners with the washers of said strips, and means for twisting the assemblies so formed from said strips.

12. Apparatus for producing washer and fastener assemblies comprising means for feeding a plural strip of washers along a predetermined path, means for separating said plural strip into a plurality of separate strips, and means for telescopically assembling fastener units with the washers of said strips.

13. Apparatus for producing washer and fastener unit assemblies comprising means for supporting a plural strip of washers in a spiral coil, means for feeding said plural strip of washers along a predetermined path from said spiral coil, means positioned adjacent said path for splitting said plural strip into a plurality of individual strips, and means for telescopically assembling fastener elements with the washers of said strips.

14. Apparatus for producing washer and fastener element assemblies comprising means for feeding a double strip of adjoined washers over a predetermined path, said washers being longitudinally interconnected in strips and corresponding washers of said strips being laterally interconnected, means along said path for oppositely bending successive corresponding washers of said strips about an axis containing the lateral interconnections substantially to fracture said lateral interconnections for splitting said double strip into individual strips, and means for telescopically assembling fastener elements with the washers of said strips.

15. Apparatus for producing unit assemblies of washers and fastener elements comprising means for feeding a plural strip of washers along a predetermined path, means for separating said plural strip into a plurality of separate strips, means for telescopically assembling fastener elements with the washers of said strips, and means for successively twisting the longitudinal interconnections to separate successive assemblies from said strips.

16. Apparatus for producing unit assemblies of washers and fastener elements comprising means for feeding a plural strip of washers along a predetermined path, means for separating said plural strip into a plurality of separate strips, means for telescopically assembling fastener elements with the washers of said strips, and means for twisting each assembly so formed relative to the adjacent assembly to separate said assemblies from said strips.

17. Apparatus for producing unit assemblies of washers and fastener units comprising means for feeding a plural strip of washers along a predetermined path, means for separating said plural strip into a plurality of separate strips, means for telescopically assembling fastener elements with the washers of said strips, and means for twisting successive assemblies so formed about the axes of said strips to separate the assemblies from said strips.

18. Apparatus for producing unit assemblies of washers and fastener elements comprising means for feeding a determined path of the strip of washers and in timed relation with said washers, and positive means for telescoping and interlocking successive nut elements and washers while said strip is fed at said uniform constant rate.

33. Apparatus for producing unit assemblies of washers and nut elements of the type having axially extending, central skirts, comprising means for feeding a strip of washers along a predetermined path, means for feeding a succession of nut elements of the type having axially extending, substantially central skirts along a predetermined path relatively converging with the predetermined path of the strip of washers and in timed relation with said strip of washers, means for inserting skirts of successive nut elements within said washers, means for outwardly swaging said skirts permanently to trap said washers on said nut elements, and means for separating the assemblies so produced from said strip.

34. Apparatus for producing unit assemblies of nut elements and washers, comprising means for feeding a strip of washers along a predetermined path, means for feeding a succession of nut elements along a predetermined path relatively converging with the predetermined path of the strip washers and in timed relation therewith, means for telescopically assembling successive nut elements and washers and for positively feeding said strip independently of the nut elements at the point of assembly, and means for separating the assemblies so produced from said strip.

35. Apparatus for producing unit assemblies of nut elements and washers comprising means for feeding a strip of washers of the type having substantially conical flanges along a predetermined path with the flanges upwardly directed, means for feeding a succession of nut elements of the type having substantially central, axially extending skirts surrounded by annular recesses along a predetermined path converging along the path of said washers with the skirts downwardly directed, a rotary member having a recessed periphery adapted to receive said strip of washers and to engage the edges thereof for positively feeding said strip, a plurality of protuberances centered in the recessed periphery of said rotary member and arcuately spaced thereabout, said protuberances having substantially conical sections, a rotatable member juxtapositioned to said rotary member and in a common plane therewith, said rotatable member being adapted to engage nut elements to force them down over said protuberances, said substantially conical sections flaring said nut element skirts outwardly beneath the flanges of said washers, means for driving said rotary member and said feeding means in timed relation, and means for separating assembled nut elements and washers from said strip.

36. Apparatus for telescopically assembling nut elements of the type having substantially central, axially extending skirts surrounded by annular recesses with a strip of washers having central conical flanges, comprising a swaging wheel having a plurality of substantially circular, interconnected recesses about its periphery substantially complementary to the outline of said strip of washers for receiving and feeding said strip, a protuberance centered in each of said recesses, said protuberances each having a substantially conical section smaller in size than the conical washer flanges, a tamping wheel juxtaposed to said swaging wheel and in a common plane therewith for engaging nut elements and forcing them over said protuberances, the conical sections on said protuberances swaging the nut element skirts outwardly to trap the conical washer flanges, and means for driving said swaging wheel and said tamping wheel in timed relation.

37. Apparatus for producing unit assemblies of conical flanged washers and nut elements of the type having substantially central axially extending skirts surrounded by annular recesses, comprising means for forwarding a strip of conical flanged washers along a predetermined path, means for feeding nut elements of the type having substantially central axially extending skirts surrounded by annular recesses along a predetermined path with the skirts oriented in either of two predetermined directions, a nut element selector having means defining a pair of branch paths displaced from one another, a wheel substantially intersecting the junction of said two branch paths and having a plurality of protuberances equally arcuately spaced about its periphery, said protuberances each having a flange directed radially outwardly from said wheel, an annular recess just inside said flange, and a rounded off central projection extending radially outwardly beyond said flange, said protuberances being adapted for complementary engagement with the skirted ends of said nut elements for directing nut elements oriented in one of said predetermined directions into one of said branch paths, said protuberances engaging nut elements oriented in the opposite direction and displacing them from said predetermined path into the other of said branch paths, means for driving said wheel at a selected rate, means for assembling nut elements passing into one of said branch paths telescopically with the washers of said strip, and means for separating the assemblies so formed from said strip.

38. Apparatus for producing unit assemblies of nut elements of the type having substantially central, axially extending skirts surrounded by annular recesses and washers of the type having substantially conical central flanges, comprising means for feeding a strip of conical flanged washers along a predetermined path, means for feeding a succession of nuts having substantially central, axially extending skirts surrounded by annular recesses along a predetermined path with the skirts oriented in either of two predetermined directions, nut element selecting means for continuing nut elements with the skirts oriented in one direction along said path and for removing nut elements with their skirts oriented in the other direction from said path, said nut element selecting means including a rotary member having a plurality of spaced protuberances each having a peripheral flange extending radially of said wheel and a central projection extending radially of said wheel beyond said flange, said flange and central projection defining an annular recess between them, said protuberances thereby being complementary in configuration to the skirted faces of said nut elements, a swaging wheel adjacent the predetermined path of said nuts and having a plurality of substantially circular, interconnected recesses spaced about its periphery and substantially complementary to the outside of said strip of washers for receiving and feeding said strip, a protuberance centered in each of the substantially circular recesses of said swaging wheel and having a substantially conical swaging section smaller than the flanges of said washers, and a tamping wheel adjacent said nut element path and said swaging wheel for engaging said nut elements and forcing said nut elements against the protuberances of said swaging wheel, said substantially conical swaging sections deforming the nut element skirts outwardly beneath the washer flanges.

39. Apparatus for producing unit assemblies of nut elements and washers, comprising means for feeding a strip of toothed lock washers along a predetermined path, confronting teeth of adjacent washers being interconnected, means for feeding a succession of nut elements along a predetermined path relatively converging with the predetermined path of the strip of washers and in timed relation with said washers, means for bringing successive nut elements and washers into telescopic association, means for coupling each telescoped washer and nut element to form a unit assembly, and means for engaging successive washers for twisting each assembled nut element and lock washer about the axis of said strip to fracture the longitudinal interconnections between the washers.

40. The method of producing unit assemblies of nut elements and washers which comprises feeding nut elements and a strip of washers along relatively converging, at least partially aligned, paths in timed relation and thereby bringing the nut elements and washers into telescopic association, coupling each telescoped washer and nut element to form a unit assembly, and engaging the washers of the assemblies so formed to twist and separate said assemblies from said strip.

41. The method of producing unit assemblies of washers and nut elements which comprises feeding a strip of interconnected washers along a predetermined path at a uniform constant rate, telescopically assembling nut elements with the washers of the constantly moving strip, and continuously engaging and twisting each washer about the axis of said strip while moving at said uniform constant rate to separate each assembled nut element and washer from said strip.

42. The method of producing unit assemblies of lock washers and nut elements which comprises feeding a strip of lock washers and a succession of nut elements along relatively converging paths into telescopic association, coupling each telescoped washer and nut element to form a unit assembly, and engaging and twisting each lock washer about the axis of said strip to separate each assembled nut element and lock washer from said strip.

43. Apparatus for producing washer and nut element assemblies comprising means for feeding a succession of washers in strip form along a predetermined path, means for feeding a succession of fastening elements along a path converging with the path of said washers, and means for simultaneously moving successive pairs of washers and fastening elements into telescopic association and deforming a portion of each such fastening element while the washers and fastening elements being acted upon are moving along a continuation of said paths, and means directly engaging each washer for twisting the telescoped assembly to separate the same from the strip.

44. Apparatus for producing washer and nut element assemblies comprising means for feeding a succession of washers in strip form along a predetermined path, means for feeding a succession of nut elements along a path converging with that of said washers, and common means for simultaneously effecting telescopic association of corresponding nut elements and washers and deforming a portion of each nut element to hold the corresponding washer permanently associated therewith while the nut elements and washers being telescoped are moving along a continuation of said feeding paths, and means directly engaging each washer for twisting the telescoped assembly to separate the same from the strip.

45. Apparatus as set forth in claim 44 wherein the common means comprises a rotating disc having a plurality of projections thereon extending through the central apertures of the washers and engaging portions of the nut elements to swage such portions into retaining engagement with said washers, and back-up means engaging said nut elements and holding said nut elements against the projections on said discs.

46. Apparatus for producing washer and fastener element assemblies comprising means for feeding a plural strip of washers along a predetermined path, said plural strip comprising a plurality of strips of washers having lateral interconnections, means tending to fracture the lateral interconnections between the plurality of strips, means for feeding the strips along relatively diverging paths to insure completion of the fracturing, means for telescopically associating fastener elements with the washers of said strips, and means for coupling each telescoped washer and fastened element to form a unit assembly.

47. Apparatus as set forth in claim 46 wherein the means tending to fracture the lateral interconnections comprise means for relatively bending the strips laterally through said interconnections.

48. Apparatus as set forth in claim 46 and further including means for separating the assemblies so produced from said strips.

49. Apparatus for producing individual assemblies of washers and nut elements comprising means for feeding a strip of washers having nut elements telescoped therewith, means engaging the washer of each assembled washer and nut element for twisting the same relative to the remainder of the strip to separate the washers from the strip, and means for operating such twisting means in timed relation with said feeding means.

50. Apparatus for producing individual fastener units of washer and fastener elements comprising means for feeding a strip of washers and fastener elements telescopically associated therewith along a predetermined path, means intersecting said path and rotatable about an axis forming an angle other than a right angle relative to said path, means for rotating said rotatable means in timed relation to the feeding of said strip, and a part of said rotating means directly engaging the washers of successive fastening units to twist successive units from said strip.

51. Apparatus as set forth in claim 50 wherein the rotatable means comprises a member rotatable substantially about the longitudinal axis of the strip and having an axial passageway therethrough through which the strip and telescoped fasteners are fed, and the part engageable with the washers to twist the units from the strip comprises a plate in said axial pasageway and parallel to the rotational axis of said member.

52. Apparatus as set forth in claim 51 wherein the plate is substantially L-shaped.

53. Apparatus for producing unit assemblies of washers and nut elements of the type having axially extending central skirts, comprising means for feeding a succession of washers in strip form along a predetermined path, means for feeding a succession of nut elements of the type having axially extending substantially central skirts along a predetermined path relatively converging with the predetermined path of the succession of washers and in timed relation with said succession of washers, means for inserting the skirts of successive nut elements within said washers, and means for outwardly swaging said skirts permanently to trap said washers on said nut elements, and means directly engaging each washer for twisting each telescoped washer and nut element to separate the same from the strip.

References Cited in the file of this patent

UNITED STATES PATENTS

| | | |
|---|---|---|
| 744,244 | Semmer | Nov. 17, 1903 |
| 1,783,218 | Burdsall | Dec. 2, 1930 |
| 1,786,469 | Williams | Dec. 30, 1930 |
| 1,861,889 | Stoll | June 7, 1932 |
| 1,946,820 | Stoll | Feb. 13, 1934 |
| 2,201,058 | Staubli | May 14, 1940 |
| 2,334,873 | Held | Nov. 23, 1943 |
| 2,390,121 | Poupitch | Dec. 4, 1945 |
| 2,418,958 | Stock | Apr. 15, 1947 |
| 2,476,326 | Sherman | July 19, 1949 |
| 2,576,906 | Poupitch | Nov. 27, 1951 |
| 2,642,592 | Nielsen | June 23, 1953 |